United States Patent Office 3,632,508
Patented Jan. 4, 1972

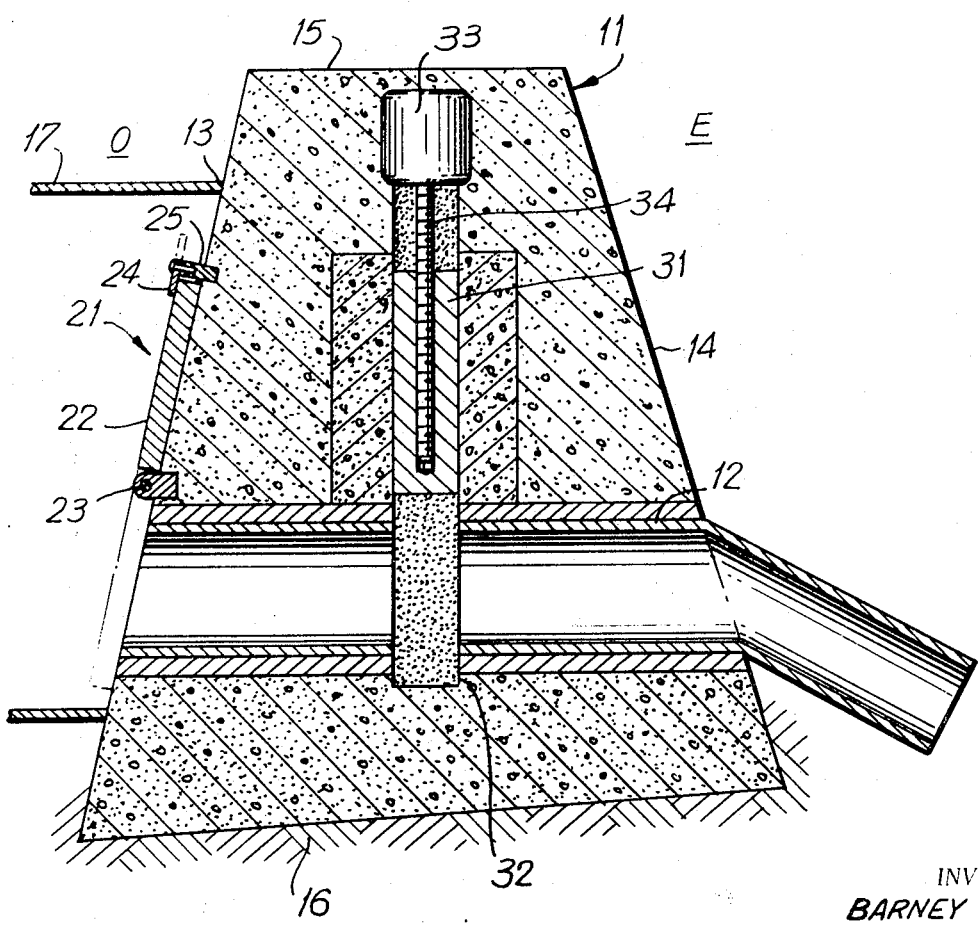

3,632,508
METHOD AND APPARATUS FOR DESILTING AND/OR DESALTING BODIES OF WATER
Barney Girden, 32 W. 76th St., New York, N.Y. 10023
Filed Jan. 21, 1970, Ser. No. 4,667
Int. Cl. B01d 21/00
U.S. Cl. 210—65                 5 Claims

ABSTRACT OF THE DISCLOSURE

One or more dam-like structures are used to isolate an estuary or lagoon from the ocean in order to be able to control the flow of water between the ocean and the estuary during changes in tide. The dam-like structure is provided with gates and valves for controlling one or more passages therethrough in order to control the flow of water between the ocean and the estuary in such predetermined manner so as to selectively de-silt the estuary, or de-salt the estuary by permitting the water in the estuary to be replaced by fresh water from the rivers feeding the estuary.

BACKGROUND OF THE INVENTION

This invention relates generally to method and apparatus for desilting and/or desalting bodies of water. Many estuaries along the seashore become completely clogged by silt and mud brought into the estuary by the run-off waters of rains, streams and rivers by sand and silt brought in by the tide. As the waters rush along the streams, they pick up and hold in suspension materials such as silt and mud. When the waters reach the estuary or lagoon, the fast-moving water entering the larger body loses its speed and its ability to hold the materials in suspension. In this manner, the materials settle out and eventually the estuary can become mud-filled or swampy and unnavigable.

In addition to entering tidal waters, the estuaries may be fed by rain or fresh water from streams and rivers with the fresh water becoming mixed with the salt water to thereby render the fresh water impotable. With increasing population and the resulting increase in pollution of rivers, people throughout the world are constantly searching for new and plentiful supplies of fresh water.

SUMMARY OF THE INVENTION

Generally speaking, in accordance with the invention, a dam-like device can be used to separate an estuary from the ocean for controlling the flow of water between the ocean and the estuary. Various gates and valves are incorporated in the dam-like apparatus and are operated to perform various functions and to carry out the method of de-silting and/or de-salting esturial waters pursuant to the instant invention.

If it is desired to de-silt an estuary, a low-level pipe or plurality of pipes through the dam is closed by means of a gate during the incoming tide. When the level of water outside the dam is substantially greater than the level in the estuary, this gate is opened to permit the water to rush in under great speed and pressure resulting from the head which can be regulated as desired, thereby stirring up the water in the estuary and forcing the silt, sand and mud into suspension. When the level of water in the estuary reaches the high tide level outside the dam, the gate is again closed and remains closed until the tide has gone out, obtaining a desired head of water in the estuary. When the gate is again opened, the water rushes under substantial speed and pressure out of the estuary and the turbulent water carries with it the suspended silt, sand and mud which is carried out of the estuary and away by the ocean currents. By this procedure, and over a period of time, the estuary will be cleaned of silt, sand and mud.

To desalt the estuary, the gate used for de-silting remains open and a one-way valve is rendered operative. Such valve permits the water to flow out of the estuary when the level of water in the estuary is higher than the level of the sea outside the dam, but prevents water from flowing into the estuary when the level of sea water is higher than that of the estuary. On the outgoing tide, the water will flow out of the estuary into the sea through the one-way valve. However, as the tide comes in, the valve will shut and will be held shut by the pressure of the water and the estuary will remain at the low-tide level. Filling of the estuary will be accomplished from the run-off waters of rains, streams and rivers which feed the estuary with fresh water. The fresh water is less dense than the salt water and thus the salt water will settle to the bottom and the fresh water will remain on top. Whenever the level of water in the estuary is higher than the level of sea water outside the dam, the salt water in the lower level of the estuary will be forced through the one-way valve into the sea.

Over a period of time, the salt water in the estuary will be replaced with fresh, run-off water.

Accordingly, it is an object of this invention to provide an improved method and apparatus for de-silting a body of water.

Another object of the invention is to provide an improved method and apparatus for de-salting a body of water.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which the figure is a sectional view of a preferred embodiment of a dam embodying the apparatus of the instant invention and capable of performing the methods of the instant invention.

DESCRIPTION OF THE PREFERRED EMBODIMENT

Referring to the figure, a dam 11 is shown in cross-section for separating the ocean O from the estuary E. The dam would extend along the entire mouth of the estuary so that all water flow between the ocean and the estuary could be blocked or controlled by dam 11.

If the land between the estuary and the ocean permits seepage or passage of water therethrough between the ocean and estuary, it will be also necessary to build a core in this porous land to prevent seepage.

Extending transversely through dam 11 is a pipe 12 for carrying exit water from the estuary out to sea through oceanside wall 13 of the dam. The opposite end of pipe 12 preferably extends through estuary side wall 14 and extends down toward the floor of the estuary in order to communicate with the water in the estuary at substantially the lowest level thereof. While the pipe 12 and other elements to be hereafter described are shown singly, it will be understood that a plurality of such apparatus may be located at spaced intervals along the dam. A one-way valve 21 is provided for controlling flow through pipe 12. In the embodiment shown, the valve consists of a cover plate 22 supported on oceanside wall 13 by hinge 23. In the phantom line position of the figure, cover plate 22 completely covers and closes one end of pipe 12. Cover plate 22 may also be rotated to an inoperative position, as shown in full lines in the figure and latched in such inoperative position by means of an arm 24 pivoted through a post 25 to oceanside wall 13.

It will be understood that when cover plate 22 is in the operative position, as represented by the phantom lines, and not latched, a greater pressure of water in the estuary will force the water to flow through pipe 12 and thereby open valve 21 to permit the water to flow from the estuary to the ocean. If the pressure on the ocean side is greater, the water pressure will press cover plate 22 against the end of pipe 12 to thereby close the valve and prevent water from flowing from the ocean to the estuary.

A second valve or gate 31 is located within the dam for selectively completely closing or opening pipe 12. A slideway 32 is formed in the dam for permitting vertical sliding movement of gate 31. A motor 33 may also be located within the dam for driving a screw 34 threadedly engaged with gate 31 for raising or lowering the gate. Gate 31 can be operated manually or by automatic control (not shown) through motor operation governed by tidal heights on either side of the dam or by other tidal factors. Suitable circuitry (not shown) is connected to motor 33, through which the raising and the lowering of the gate is effected.

The height of dam 11, as determined by top wall 15, above the bed 16, is selected so as to be sufficiently high to prevent water from flowing over the top wall, regardless of the height of the tide. In order for the method of the instant invention to properly operate, all water into and out of the estuary between the estuary and the ocean must flow through pipe 12.

The method of the instant invention may now be described in connection with the disclosed apparatus.

If an estuary is badly filled with silt, mud, etc., a dam would be built thereacross, having the various valves and gates disclosed herein, located throughout the dam at spaced intervals. To commence desilting, gate 31 is closed at low tide, when the level of water in the estuary and the ocean are the same. When the level of water reaches the desired head, the head of water on the ocean side may be several feet above the level of water on the estuary side. Thereupon, one or more gates 31 are opened and the water rushes through pipe 12 under a substantial head resulting in substantial turbulence. The rushing water is directed by pipe 12 to the bottom of the estuary and the turbulence causes the silt and other collected debris to be stirred up and suspended. When the level of water in the estuary has reached substantially the high tide level, the gate is again closed and remains closed as the tide goes out. When the ocean side is at low tide, the gate is again opened and the water having all the materials in suspension rushes out through the pipes to carry off the silt and other materials. The silt delivered to the ocean will be dissipated by the prevailing ocean currents. In order to insure that the silt, salt and other materials are dispersed by ocean currents, one end of a duct 17 communicates with pipe 12 and has its opposite end sufficiently far out in the ocean where ocean currents are adequate to dissipate such materials.

The cycle is continually repeated, with each tidal cycle. By using certain gates along the length of the dam, areas can be desilted and, when desilting is completed, other areas can then be desilted. The width, depth, tide change level, thickness of debris and other factors will determine how long it may take to desilt an estuary. The volume of water and its speed are the factors involved in desilting the estuary. When you consider that the volume of water entering an average bay is estimated in billions of tons per tide entering and leaving two times a day the power potential becomes apparent. The scouring effect if properly applied can quickly remove silt and mud and swamp.

The term "estuary" as used herein includes any tidal body of water connected with an ocean, such as lagoons, bays or drowned rivers.

It should also be understood that, if the body of water being desilted or desalted is used for navigation, a suitable number of locks can be provided for a navigable connection across the dam. Also when the estuary is completely cleared of silt but is not to be desalted, the gate or gates can be closed and all water will enter or leave through the open locks, which then become a passageway for boats and water.

If the body of water thus desilted is, in fact, an estuary fed with fresh water by rains, streams and rivers, the body of water can also be desalted. This results from the fact that fresh water is less dense than salt water and the water with the highest concentration of salt will generally be at the lowest level of the body of water.

With gate 31 in a raised position and one-way valve 21 in operative position, an outgoing tide will permit the estuary to be emptied through pipe 12 to the level at low tide. As the tide starts to come in, the pressure of the water against cover plate 22 will press the cover plate tightly against the end of pipe 12 to thereby close the pipe. Thus, no water can enter the estuary from the ocean. Regardless of the level of the tide, water will flow only from the estuary to the ocean and only when the level in the estuary is greater than the level in the ocean.

Once the estuary has been emptied to the low tide level, it will be refilled by fresh water coming from the feeding rivers and streams. The fresh water will generally be at the surface while the salt water is at lower levels, and, any time that the level of water in the estuary is greater than the level of water in the ocean, salt water will be forced out through pipe 12, which communicates with the estuary near the bottom thereof. Over a period of time, the salt content in the water in the estuary can be reduced to such a level that it may be potable, thereby turning the estuary into a reservoir.

While certain mixing of the fresh and salt water will occur in the estuary, the estuary will eventually have the salt content reduced to potable quantities.

While the water in the estuary may require purification as a fresh water supply, the method of the invention will render it unnecessary to desalinize the water.

In reclaiming run-off water by damming estuaries to form basins or reservoirs as outlined hereinabove, there are special advantages in the method outlined. If the runoff water is clean, the water in the reservoir is ready for use when sufficiently desalted. If the run-off water is "used water" or sewage, the tidal pump method as herein described would not only eliminate the salt but the outflow would carry out the sludge with the saline water.

The great demand on ground water is constantly lowering the level. This causes ocean water to seep into the ground water in many areas. When the water of an estuary is desalted, it becomes a fence preventing the salt ocean water from encroaching into the ground water, and at the same time the desalted water is an additional source to maintain the level of fresh ground water which will be an enormous increase of available usable fresh water.

When the salt water has been eliminated from the reservoir, it may be desirable to latch one-way valve 21 in a closed position or to close gate 31 until such time as salt water may seep back into the reservoir. Also, the height of the dam, which must be sufficient to prevent salt water from flowing thereover at a flood tide, should preferably permit excess fresh water to flow thereover if one-way valve 21 or gate 31 has been fixed in closed position.

It will thus be seen that the objects set forth above among those made apparent from the preceding description, are efficiently attained, and, since certain changes may be made in carrying out the above method and in the construction set forth without departing from the spirit and scope of the invention, it is intended that all matter contained in the above description and shown in the accompanying drawings shall be interpretated as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A method of desilting an estuary by utilizing an ocean comprising the steps of separating the ocean from the estuary by means of a dam, providing passage means for water through said dam at a level substantially at the floor of said estuary and at the floor of said ocean, providing a gate for said passage means and controlling the operative position of said gate to permit flow of water through said passage means in both directions only when the level of water on one side of said dam is substantially different than the level of water on the other side of said dam, said steps including cyclically closing said gate substantially at low tide of the ocean, holding said gate closed until the ocean substantially reaches high tide, opening said gate to permit ocean water to enter the estuary with substantial turbulence through said passage means to stir up and suspend the silt in the estuary, closing said gate after the level of water in the estuary reaches the level of the ocean, holding said gate closed until the ocean substantially reaches low tide, opening said gate to permit estuary water to enter the ocean through said passage means and carry into the ocean the suspended silt, and holding said gate open until the level of water in the estuary drops to the level of the ocean.

2. A method of desilting an estuary by utilization of an ocean comprising the steps of separating the ocean from the estuary by means of a dam, providing passage means for water through said dam at a level substantially at the floor of said estuary, causing said passage means to communicate with the water in said estuary substantially below the surface of said estuary and controlling the flow of water through said passage to prevent flow of water from said ocean to said estuary and permit flow of water from said estuary to said ocean when the level of water in said estuary is higher than the level of water in said ocean, said steps including the cyclical closing of said passage means whenever the level of the ocean is above the level of water in the estuary, the continuous filling of the estuary with fresh water by feeding rivers and streams, and the cyclical emptying of the estuary when the level of water in the estuary is above the level of the ocean by the opening of said passage means to transfer to the ocean, salt water located below the level of the feeding fresh water.

3. A method of desilting and desalting an estuary by utilization of an ocean comprising the steps of separating the ocean from the estuary by means of a dam, providing passage means for water through said dam at a level substantially at the floor of said estuary and at the floor of said ocean, causing said passage means to communicate with the water in said estuary substantially below the surface of said estuary, providing valve means for said passage means, selectively controlling the operative position of said valve means to permit flow of water through said passage means in both directions only when the level of water on one side of said dam is substantially different than the level of water on the other side of said dam, said steps including cyclically closing said gate substantially at low tide of the ocean, holding said gate closed until the ocean substantially reaches high tide, opening said gate to permit ocean water to enter the estuary with substantial turbulence through said passage means to stir up and suspend the silt in the estuary, closing said gate after the level of water in the estuary reaches the level of the ocean, holding said gate closed until the ocean substantially reaches low tide, opening said gate to permit estuary water to enter the ocean through said passage means and carry into the ocean the suspended silt, and holding said gate open until the level of water in the estuary drops to the level of the ocean, whereby to desilt the estuary; and controlling the flow of water through said passage means to prevent the flow of water from said estuary to said ocean when the level of water in said estuary is higher than the level of water in said ocean, said steps including the cyclical closing of said passage means whenever the level of the ocean is above the level of water in the estuary, the continuous filling of the estuary with fresh water by feeding rivers and streams, and the cyclical emptying of the estuary when the level of water in the estuary is above the level of the ocean by the opening of said passage means to transfer to the ocean, salt water located below the level of the feeding fresh water, whereby to desalt the water in the estuary.

4. Apparatus for desilting and/or desalting an estuary by utilization of an ocean comprising a dam, passage means for water through said dam, said passage means comprising at least one pipe extending through said dam between the estuary and the ocean, said pipe being located at one end thereof substantially at the level of the floor of said estuary and at the other end thereof substantially at the level of the floor of said ocean, a first one-way valve cooperating with said passage means for preventing flow of water from said ocean to said estuary when the level of water in said ocean is greater than the level of water in said estuary and for permitting the flow of water from said estuary to said ocean when the level of water in said estuary is greater than the level of water in said ocean, a second valve movably mounted in said ram and movable from a position completely blocking said passage means to a position not obstructing said passage means, and control means for operating said second valve.

5. Apparatus as claimed in claim 4 and further including latch means for latching said first one-way valve in a fully open position.

References Cited

UNITED STATES PATENTS

| | | | |
|---|---|---|---|
| 978,468 | 12/1910 | Merritt | 61—25 |
| 1,404,092 | 1/1922 | Chapman et al. | 61—18 |
| 1,734,440 | 11/1929 | Markman | 61—30 |
| 3,289,417 | 12/1966 | Girden | 61—25 X |

J. L. DECESARE, Primary Examiner

U.S. Cl. X.R.

61—30; 210—170